April 28, 1959     H. J. WILLMOTT     2,883,685
PRESSURE APPLYING MACHINES
Filed Feb. 16, 1956     8 Sheets-Sheet 8
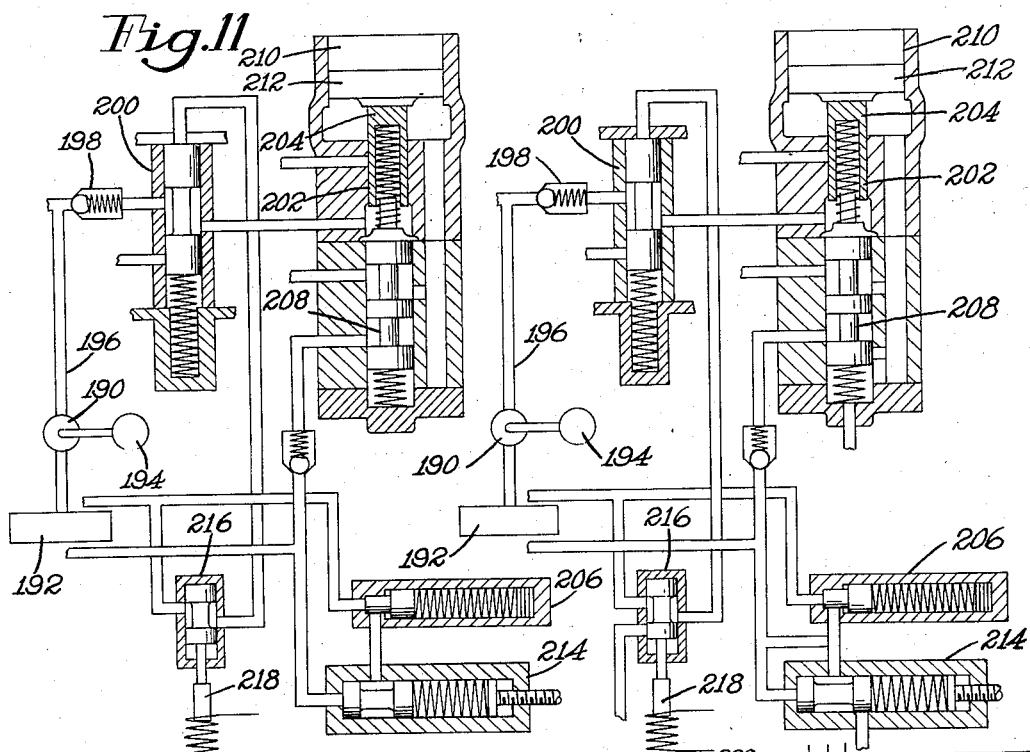
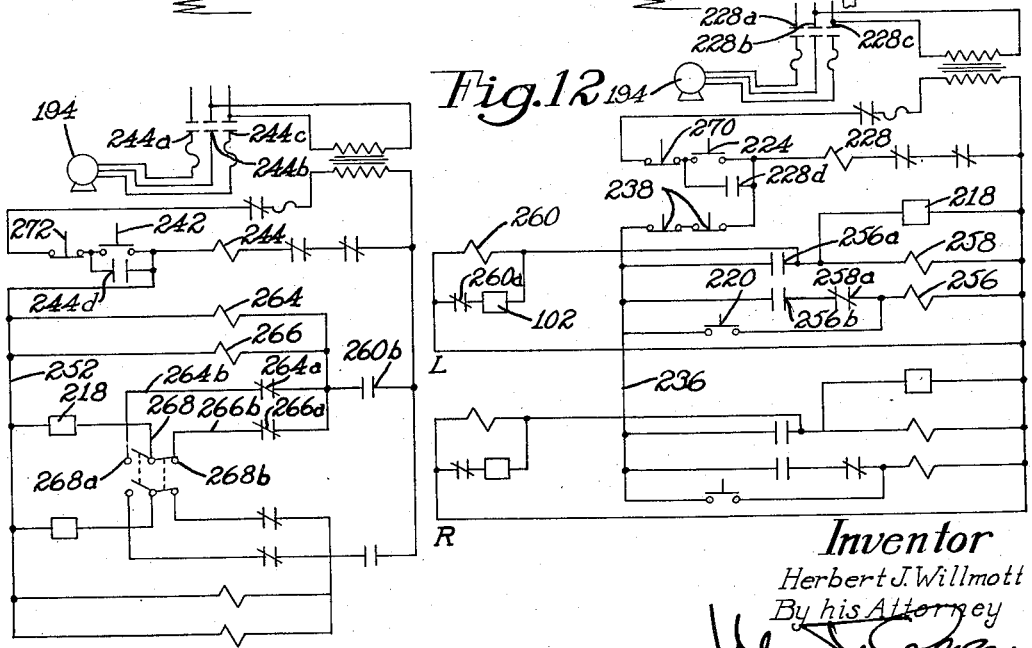
Inventor
Herbert J. Willmott
By his Attorney

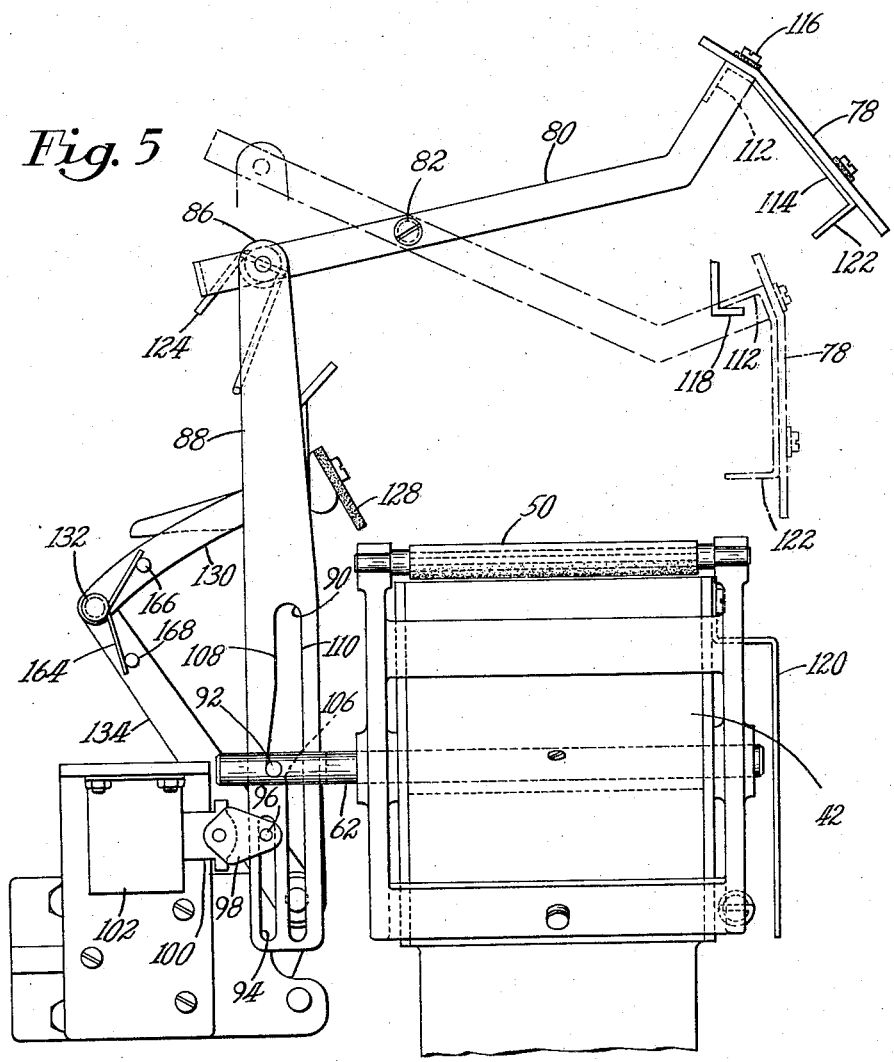

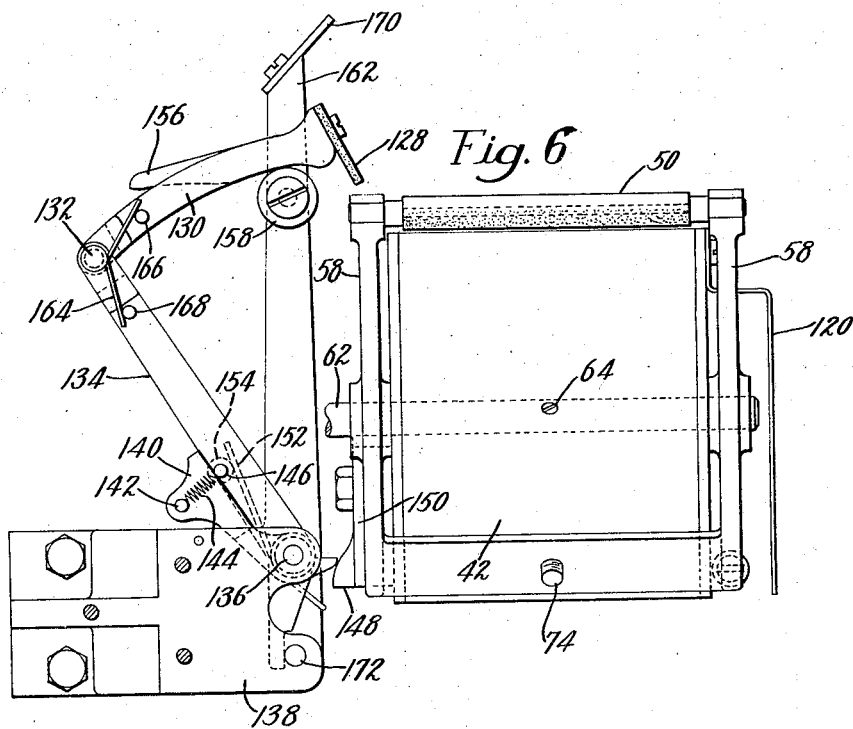
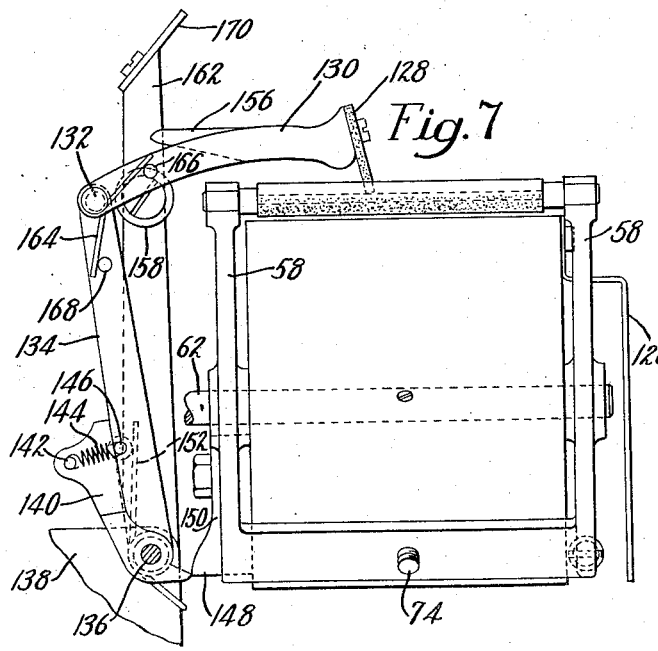
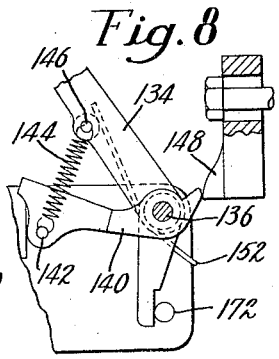

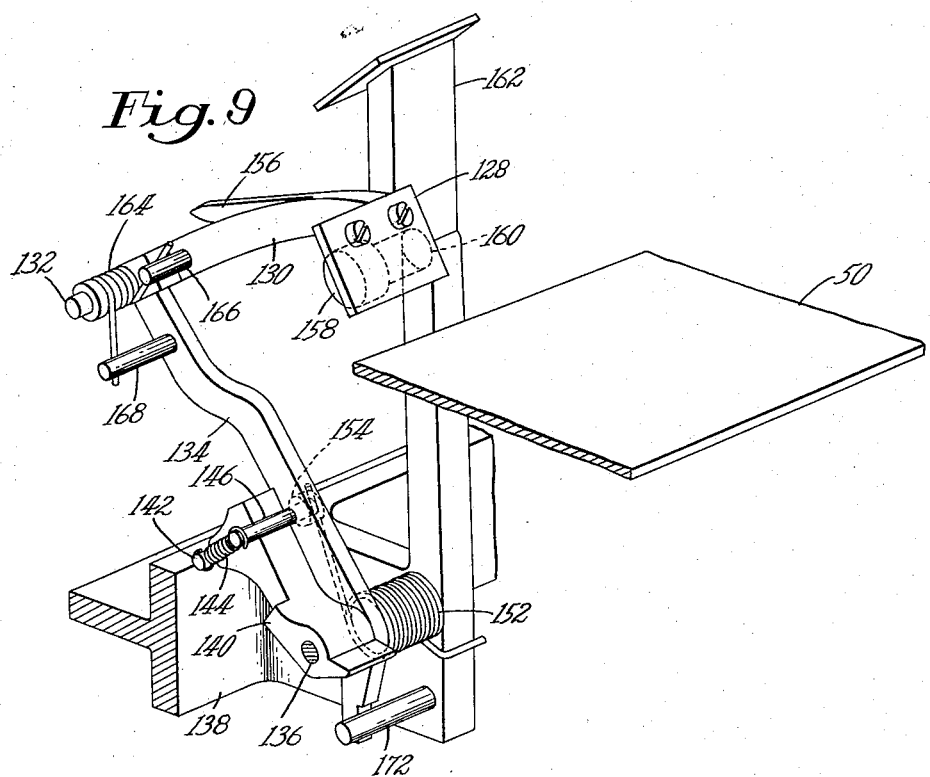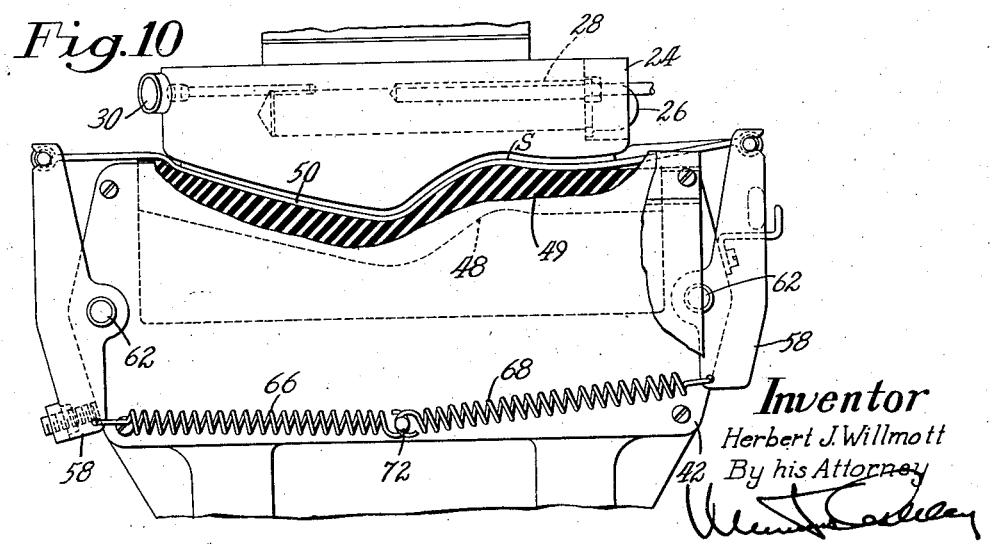

United States Patent Office 2,883,685
Patented Apr. 28, 1959

2,883,685

PRESSURE APPLYING MACHINES

Herbert J. Willmott, Beverly, Mass., assignor to United Shoe Machinery Corporation, Boston, Mass., a corporation of New Jersey Application February 16, 1956, Serial No. 566,022

19 Claims. (Cl. 12—18.5)

This invention relates to pressure applying machines, and more particularly to machines for applying pressure to shoes and shoe parts. The invention is herein illustrated as embodied in a combination comprising a machine for applying pressure to loose outsoles, the attaching faces of which have been precoated with a thermoplastic cement, to mold them to the desired shape in conformity with the bottoms of shoes to which they are to be attached and simultaneously therewith activating the cement, and a machine in which the soles prepared in the first-mentioned machine are bonded to lasted shoes. It will be understood, however, that in certain of its aspects the invention is not thus limited in its applicability.

A method and a machine for molding outsoles coated with thermoplastic cement and for simultaneously activating the cement thereon are disclosed in United States Letters Patent No. 2,443,693, granted June 22, 1948, upon an application filed in the name of Hans C. Paulsen. The patented machine is a twin station machine comprising a yielding sole supporting pad carried by a pad box at each station and having a molding surface which cooperates with a heated metal mold or form having a molding surface complemental to the surface of the pad, and fluid pressure means rendered operative by depression of a treadle associated with each station to move the pad box at the selected station relatively to the heated form, to mold the sole and simultaneously activate the cement on its attaching face.

As pointed out in the patent, an important advantage resulting from this procedure is that it permits a sole so treated to be assembled almost immediately with a shoe and placed under pressure in a sole attaching machine to effect its permanent attachment to the shoe while the cement is in tacky condition, thus eliminating the necessity of activating the cement on an outsole as a distinct operation prior to the attachment of the sole to a shoe, and hence substantially increasing the rate of production. As further suggested in the patent referred to, the machine may advantageously be located opposite a sole attaching machine so that the operator may place the sole and a shoe to which it is to be attached in the attaching machine without any appreciable lapse of time between the molding and cement activation and the sole attachment.

It is an object of this invention to further enhance the advantages gained by the process of the previously mentioned patent by eliminating the need of separately operating each machine, and thereby further reduce the lapse between the molding and activating operation and the sole attaching operation, and also substantially increase the efficiency of the operator in charge of both machines. With this object in view, the invention provides an improved sole molding and cement activating machine, in combination with a sole attaching machine, the two machines being organized and synchronized to be operated in unison by a single operator in such manner that operation of one of said machines is automatically controlled by operation of the other.

As herein illustrated, there is provided a twin station sole molding and cement activating machine having at each station a sole supporting pad box or lower mold and a cooperating heated mold, and a twin station sole attaching machine having at each station a pad box for supporting an assembled sole and shoe and cooperating pressure members. Each station of each machine is provided with electrical and fluid pressure mechanisms for operating the pad boxes at the respective stations to move them relatively to the cooperating pressure applying members, the fluid pressure mechanisms including small pistons which elevate the pad boxes at the selected stations rapidly to apply light pressure to the work, and large pistons which become effective upon resistance to further upward movement of the pad boxes to exert final, heavy pressure to the work. Initiation of movement of the pad boxes of both machines to pressure applying position is effected by depression of a treadle associated with each station of the sole attaching machine only. No treadles are provided for operating the corresponding pad boxes of the sole molding and cement activating machine, operation of the pad boxes in this machine being automatically effected by electrical means controlled by the sole attaching machine.

In the illustrated construction, the electrical controls comprise a switch connected to the treadle of each station of the sole attaching machine. Depression of the treadle at the selected station of that machine to initiate a cycle of operations at that station and at the corresponding station of the molding and cement activating machine energizes a control relay in the sole attaching machine, thereby establishing a holding circuit which permits the operator to release the treadle immediately after depressing it, the holding circuit remaining closed until opened by a timer which is set to open at the end of a predetermined period. Closing of the holding circuit also energizes a solenoid which controls a valve in the fluid pressure system to permit pressure fluid to flow to the cylinder in which the small piston is movable to elevate the pad box to pressure applying position. The period for which the timer is set corresponds to that during which a sole and shoe are to be maintained under pressure to bond them together. At the end of the selected period, the timer contacts open, causing the holding circuit to open and the valve solenoid to be deenergized, to relieve the pressure from the cylinder and allow the pad box to return to its open inoperative position.

Each station of the sole molding and cement activating machine is similarly provided with a timer which is energized at a predetermined time after the energization of the timer in the sole attaching machine. This time delay is provided because less time is required for the molding operation than is required for the sole attaching operation, and it is desirable that the molding operation be completed just before completion of the sole attaching operation. Energization of the timer in the molding and cement activating machine energizes a solenoid which controls a valve similar to the valve in the corresponding station of the sole attaching machine, to permit pressure fluid to actuate the small piston to move the lower mold or pad box toward the upper mold. The period during which the timer at each station of the molding and activating machine remains energized determines the period during which the sole will be subjected to molding pressure. Since the soles to be molded may be either leather or rubber, and since leather requires a longer molding period than rubber, means is provided for selectively determining the moment at which the timer of the molding and activating machine will be deenergized to relieve the fluid pressure and allow the lower mold or pad box to move away from the upper mold. For this purpose a selector switch is provided which the operator may move to either of two positions, to determine the moment of deenergization of the timer according to the type of soles to be molded.

To enable the operator to stop the operation of the two machines, if for any reason he finds it necessary to do so, before the end of the cycle automatically determined by the timing mechanisms, means is provided whereby the operator may accomplish this result at either of the two machines at which he happens to be stationed at the moment. As herein illustrated, each machine is provided with a normally closed safety switch, the two switches being connected in series and to the holding circuit in the sole attaching machine. Opening of either switch will break the holding circuits in both machines and deenergize the valve controlling solenoids to release the pressure under the pistons and allow the pad boxes to descend.

Since, as explained, upward movement of the pad box or lower mold at each station of the molding and activating machine is automatically produced by depression of the treadle of the corresponding station of the sole attaching machine a predetermined time after the station of the sole attaching machine operates to apply pressure to a sole and a shoe, it is desirable to ensure against the danger that the operator, after depressing the treadle at a selected station, may have his hand caught between the lower and upper molds if he should inadvertently attempt to manipulate the sole on the lower mold after the mold has begun to rise. To guard against this danger there is provided at each station of the molding and activating machine safety means which is automatically operated by depression of the treadle at either station of the sole attaching machine, to be lowered into a position in which it closes off the space between the cooperating molds, the safety means remaining in that position until the solenoid controlled valve has been rendered effective to move the lower mold into pressure applying position. The safety means is operatively connected to the lower mold or pad box and is returned to its inoperative position by movement of the lower mold away from the upper mold at the end of a molding operation.

These and other features and advantages of the invention will now be described in greater detail, with reference to the accompanying drawings, and particularly pointed out in the claims.

In the drawings,

Fig. 5 is a view in end elevation of a pad box of the molding and cement activating machine, this view illustrating a safety guard mechanism provided to close off the zone between the pad box and the heated mold when the operator actuates a treadle at either station of the sole attaching machine to initiate an operating cycle in both machines;

Figs. 6 and 7 are views in end elevation of a pad box of the molding and cement activating machine and of means associated with the pad box for displacing a sole on the blanket at the end of a molding and activating operation, the views showing the means in inoperative and operative positions, respectively;

Fig. 8 is a detail, partly in section, of a portion of the mechanism illustrated in Fig. 6;

Fig. 9 is a detailed perspective view of the sole displacing means illustrated in Figs. 6, 7 and 8;

Fig. 10 is a view in front elevation, partly in section, of a pad box of the molding and cement activating machine in its pressure applying position to mold a sole located on the blanket and to activate the cement on the sole;

Fig. 11 is a schematic view of fluid pressure operating mechanisms in the left-hand station of each of the two machines, the mechanisms being represented in the positions which they occupy when the machines are at rest; and Fig. 12 is a wiring diagram of the electrical controls for both stations of both machines.

The invention is illustrated as embodied in a combination comprising a twin station machine A (Fig. 1) for molding outsoles coated on their attaching faces with a thermoplastic cement and simultaneously activating the cement to prepare them for attachment to shoe bottoms, and a twin station machine B in which the thus prepared soles are permanently attached to lasted shoes. The two machines are so interconnected and synchronized that initiation of a cycle of operations at one station of the sole attaching machine automatically initiates, at a predetermined time, a cycle of operations of selected predetermined duration in the corresponding station of the sole molding and cement activating machine.

Figure 1:
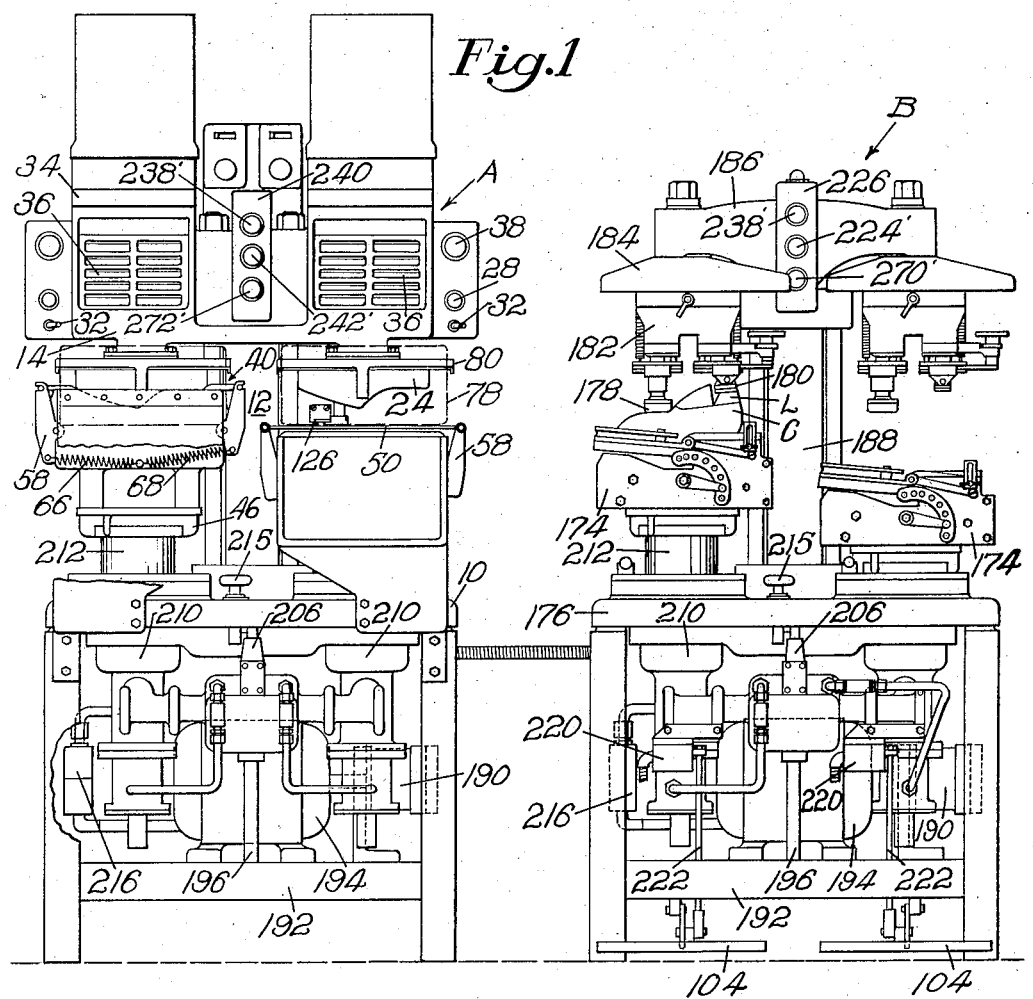
Fig. 1 is a view in front elevation of a sole molding and cement activating machine provided by the present invention and a sole attaching machine, this view showing the pad boxes of the left hand stations of the two machines in operative, or pressure applying positions, and the pad boxes in the right-hand stations in their open, or inoperative positions.
Figure 2:
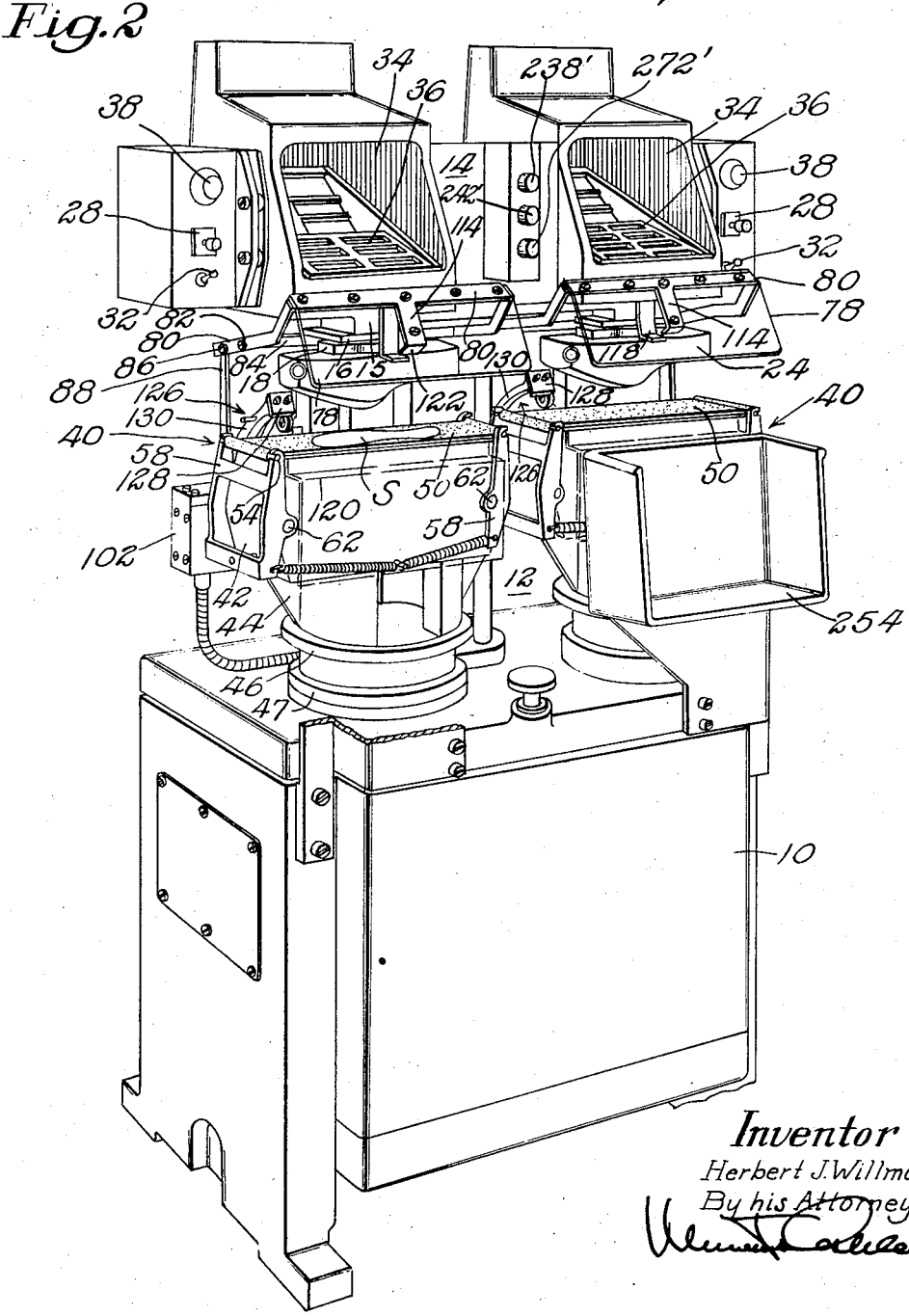
Fig. 2 is a perspective view of the molding and cement activating machine shown in Fig. 1.

Referring more particularly to Fig. 2, the sole molding and cement activating machine A comprises a base 10 in the form of a housing containing fluid pressure mechanism to be described hereinafter. From the base rises a post 12 which supports a casting 14 having at each of its opposite ends a depending boss 15 to which is secured a plate 16 bolted to a second plate 18. The plate 18 is provided with a downwardly extending T-shaped projection 20 (Fig. 3) adapted to engage in a similarly shaped groove 22 formed in the top of a metal mold or form 24 which is adjustable lengthwise with relation to the plate 18. Each mold 24 is heated by an electric unit 26 controlled by a thermostat 28 (Fig. 1) to heat the mold to the required temperature to activate the thermoplastic cement on an outsole S during the molding operation without risk of damaging the outsole material. The temperature of the mold member should in all cases be selected to suit the requirements of the cement to be activated and may, for example, range between 350 and 500° F. A thermometer 30 mounted in each mold indicates at all times the temperature of the mold member. To insure that the molded outsole will not adhere to the mold after activation of the cement, the mold is preferably coated with a composition such as polytetrafluorethylene, which is sold commercially under the name of "Teflon" and is a heat and solvent resistant material known to have a low friction coefficient. An electric switch 32 (Fig. 2) is provided for each heating unit 26.

In the casting 14 at each station of the machine is formed a cabinet 34 having therein a grid 36 for supporting, right side up, a pair of lasted shoes to which outsoles molded in the machine are to be attached in the sole attaching machine. Each cabinet is heated by an electric heating unit (not shown) provided with a variable duty cycle control 38 which maintains the cabinet heated at a suitable temperature to activate the thermoplastic cement on the bottoms of the shoes to which the molded soles are to be attached.

The heated mold 24 at each station cooperates with a lower mold generally indicated by the reference numeral 40 (Figs. 1 and 2). The lower mold comprises a substantially rectangular box 42 formed integral with a casting 44 which is secured to a plate 46 carried by a bracket 47 supported at the upper end of a piston forming part of the fluid pressure mechanism housed in the base 10 and by which the lower mold is moved to pressure-applying position relative to the upper mold 24. In the box 42 is mounted a block of hard wood 48 (Fig. 3) supporting a resilient pad 49 having a molded surface complemental to the work engaging surface of the mold 24.

For supporting a sole on the pad box there is provided, in accordance with a feature of the invention, a flexible blanket 50 (Figs. 2, 3 and 4), of novel design with which is integrally formed, by vulcanization, visual gaging means enabling the operator to locate a sole accurately with relation to the upper mold member. As herein illustrated, the visual gaging means is formed by a plurality of spaced dots 52 (see Fig. 4) arranged in a pattern corresponding to the contour of a sole, although it will be understood that the gaging means may consist of a continuous formation corresponding to the contour of a sole. Preferably, the gaging means should be of a color different from that of the blanket. The blanket 50 is mounted for adjustment longitudinally and transversely of the pad box 42 on pins 54 (Figs. 2 and 3) received in the hooked upper ends 56 of yokes 58, 58 pivotally mounted on shafts 62, 62 extending transversely through the end walls of the pad box and secured against rotation by setscrews 64 threaded through the end walls.

Figure 3:
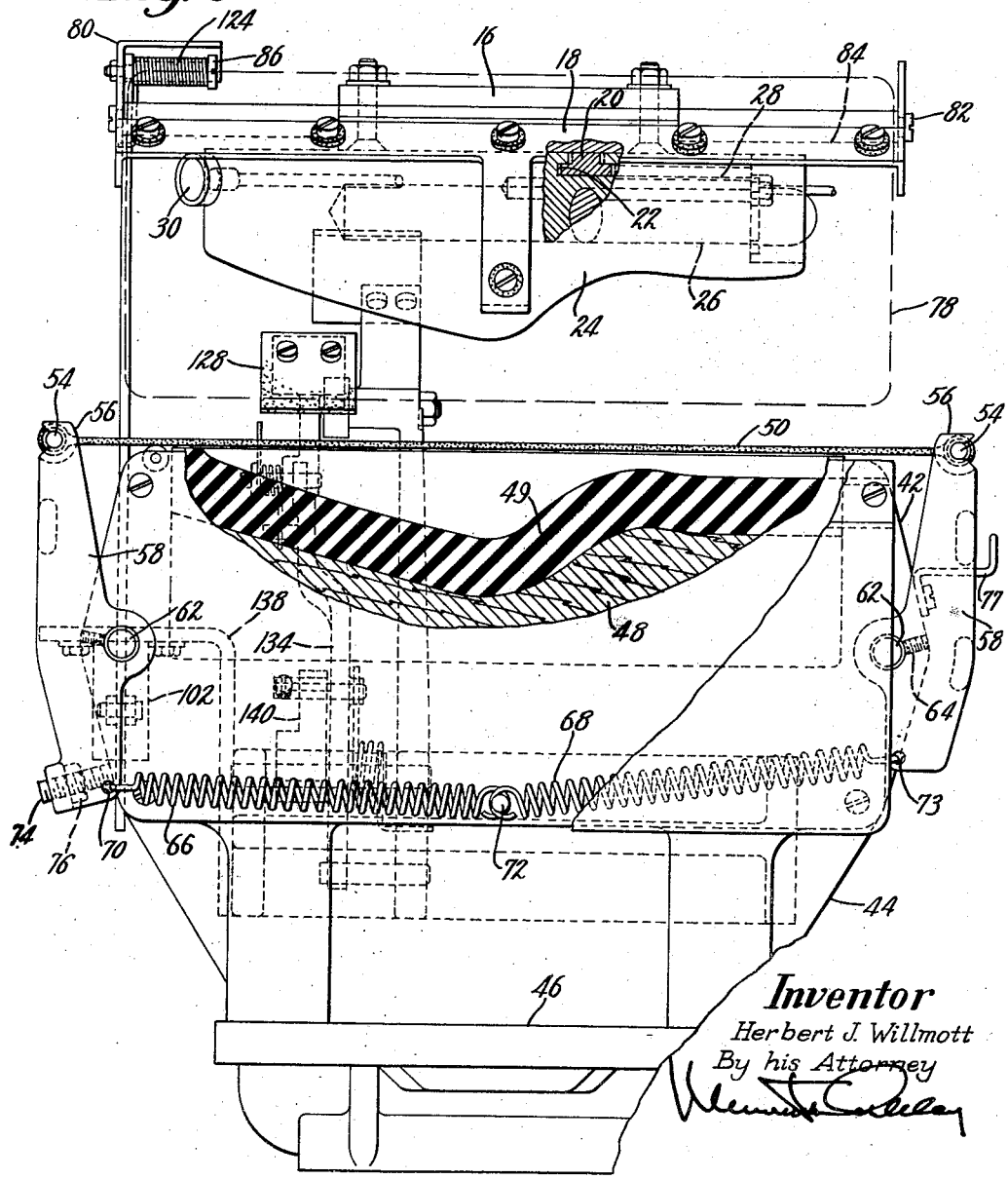
Fig. 3 is a view in front elevation, partly in section, of the pad box of one station of the molding and cement activating machine in its normal inoperative position.
Figure 4:
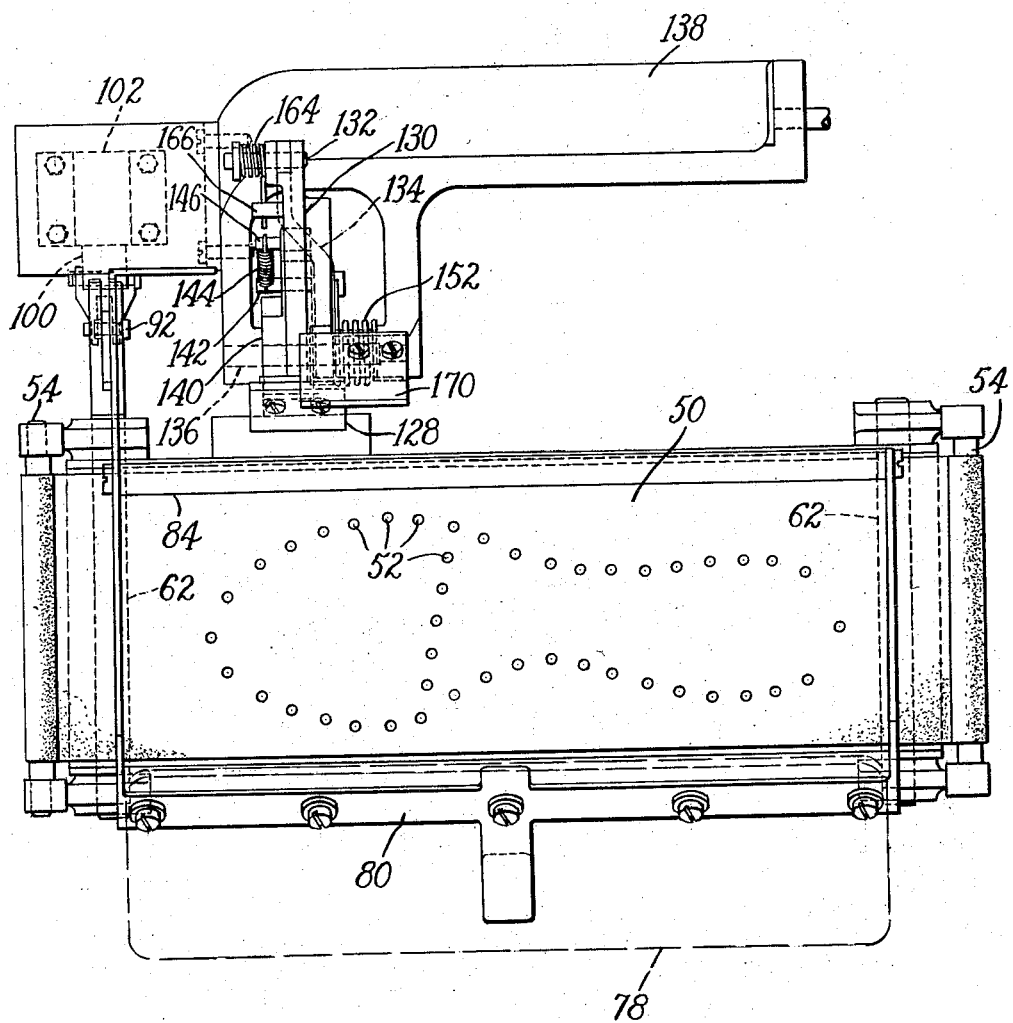
Fig. 4 is a plan view of a pad box of the molding and cement activating machine, this view illustrating a flexible blanket mounted on the pad box for supporting an outsole.

The flexible blanket 50 associated with each pad box 42 is maintained in stretched condition by tension springs 66 and 68 (Fig. 3). The spring 66 has one end hooked through a hole 70 provided in the lower outer end of the left-hand yoke 58 and its other end is attached to a pin 72 fixed in the lower mid-portion of the front side wall of the box. The spring 68 has one end hooked through a hole 73 provided in the lower end of the right-hand yoke 58 and its other end is attached to the pin 72. For varying the position of the flexible blanket 50 longitudinally or endwise with relation to the pad box for soles of various sizes, an adjusting screw 74 (Fig. 3) is threaded through the lower end of the yoke 58 at the left end of the pad box and maintained against the corresponding end wall of the box by the spring 66. The blanket 50 may be shifted bodily to the right or left, with reference to Fig. 3, by turning the screw 74 in one direction or the other, a lock nut 76 being provided for maintaining the screw in the adjusted position. A stop 77 is provided on the inner end wall of each pad box to limit swinging movement of the yoke at that end of the pad box in the event the blanket 50 should break.

In accordance with a feature of the present invention, there is provided at each station of the molding and activating machine A a guard 78 (Fig. 2) which is automatically operated by the means provided in the sole attaching machine B for initiating the operating cycle of both machines, to close off the area between the upper and lower molds 24 and 40 of the machine A, thereby to eliminate the risk of injury to the operator's hands if he should inadvertently attempt to manipulate the sole placed on the blanket 50 before the lower mold has been moved into operative relation with the upper mold. The guard 78 comprises a substantially rectangular plate, which may preferably be of a transparent material, for example, Lucite. The plate is secured to a bracket 80 mounted for swinging movement on studs 82 secured in a rod 84 fast on the undersurface of the plate 18.

A rearwardly extending arm of the bracket 80 is pivotally connected by a stud 86 to the upper end of a downwardly extending link 88 (see Fig. 5). The link 88 is provided with a slot 90 through which extends a pin 92 carried by the rear, bifurcated end of the shaft 62 on which the left-hand yoke 58 is mounted. In the lower portion of the link 88, rearwardly of the slot 90, there is provided a second slot 94 in which is received a pin 96 extending through the arms of a yoke 98 connected to the armature 100 of a solenoid 102 which, as will hereinafter be explained, is energized to operate the guard 78 when a treadle 104 (Fig. 1) associated with each station of the sole attaching machine B is operated to initiate the operation of both machines. The guard 78 is held in its normally raised, inoperative position by engagement of the pin 92 with a shoulder 106 formed on the left-hand side 108 of the slot 90. When the solenoid 102 is energized by depression of the treadle 104, as previously mentioned, the link 88 is pulled rearwardly, or to the left as seen in Fig. 5, thereby disengaging the shoulder 106 from the pin 92 and permitting the link 88 to move upwardly and the guard bracket 80 to swing in a clockwise direction, by gravity, from the position shown in full lines to that shown in broken lines in Fig. 5, to close off the space between the upper and lower molds. Downward swinging movement of the guard bracket 80 is limited by engagement of an upper, rearwardly extending portion 112 of a member 114 secured by bolts 116 to the guard 78, with a lug 118 extending forwardly from the lower end of the casting at each station of the machine. At a predetermined moment in the cycle of operations, determined by a timing mechanism shortly to be described, the pad box 42 is elevated to bring the sole S (Fig. 2) located on the blanket 50 into contact with the upper mold 24. When the pad box reaches its raised position, the upper end of a cover plate 120 secured to the front wall of the pad box engages a lower, rearwardly extending portion 122 of the member 114 and moves the guard 78 upwardly to prevent the guard bracket 80 from contacting the blanket 50.

At about the time the pad box 42 is caused to rise, the solenoid 102 is deenergized, thereby releasing the link 88 to the action of a torsion spring 124 (Fig. 5) coiled around the stud 86 pivotally connecting the guard bracket 80 to the link 88, one end of the spring engaging the rear end of the guard bracket and the other end engaging the link. The spring 124 moves the link 88 to the right, bringing the left-hand side 108 of the slot 90 into engagement with the pin 92, so that, when, at the end of the predetermined molding cycle, the pad box is permitted to descend by gravity, the pin 92 moves down with it until it engages the shoulder portion 106 of the slot 90 and, as the pad continues its downward movement, the link 88 is moved downwardly and the guard bracket 80 swings in a counterclockwise direction, as seen in Fig. 5, to its retracted, inoperative position.

To assist the operator in removing an outsole, after it has been molded, without risk of having his hand contact the hot metal mold 24, there is provided at each station, means operated by the downward movement of the pad box 42 at the end of a molding operation to push the molded sole forwardly on the blanket 50. The means, identified generally by the reference numeral 126 (Figs. 1 and 2), comprises a member 128, preferably a square piece of rubber, which is secured to the forward end of an arm 130 (Figs. 6, 8 and 9), the rear, bifurcated end of which is pivotally connected by a pin 132 to a downwardly extending lever 134 mounted on a shaft 136 fixed in a bracket 138 fast on the post 12 at the rear of the pad box 42. On the same shaft 136 there is mounted for swinging movement a dog or latch member 140 having a laterally extending pin 142, to the outer end of which is attached one end of a tension spring 144, the other end of which is attached to a pin 146 extending laterally from the lever 134, the spring 144 normally maintaining the dog 140 in engagement with the pin 146.

The dog or latch 140 is arranged to cooperate with a cam portion 148 formed on a bracket 150 secured to the rear side wall of each pad box. A torsion spring 152 is mounted on the shaft 136, one end of the spring engaging a boss 154 on the lever 134, the other end of the spring engaging the bracket 138. Referring to Fig. 6, in the normal inoperative position of the sole pushing means, the latching end of the dog 140 is located above the cam portion 148 of the bracket 150. When the pad box is elevated to press a sole against the upper mold 24, the cam 148 actuates the dog 140 which swings in a counterclockwise direction, against the tension of the spring 144, until the pad box has moved a distance sufficient to clear the latching end of the dog, which thereupon swings in a clockwise direction, under the action of the spring 144, back to the position of Fig. 6, with the lower, latching end of the dog below the cam 148. When, at the end of a molding operation, the pad box descends, the cam 148 actuates the dog 140 which, by its action against the pin 146 carried by the lever 134, causes this lever to swing in a clockwise direction to move the arm 130, and the rubber member 128 carried thereby, forwardly over the blanket 50 into engagement with the forepart of the sole to push it forwardly. The lever 134, and hence the arm 130, are rapidly returned to their initial positions by the spring 152 as soon as the cam 148 has cleared the dog 140.

To insure that the rubber member 128 which displaces the sole on the blanket will be raised sufficiently in the forward movement of the arm 130 to clear the top of the blanket 50 and then be lowered into engagement with the blanket, the arm 130 is formed with a cam portion 156 with which engages a roll 158 mounted on a stud 160 secured to an upwardly extending arm 162 of the bracket 138. As the arm 130 swings in a clockwise direction, or forwardly of the machine, the roll 158 first engages a high portion of the cam 156, thereby imparting to the arm 130 an upward component of movement until the member 128 has cleared the edge of the blanket 50, and engages thereafter a low portion of the cam, permitting the lever to move downwardly to bring the member 128 into position to displace the forepart of the sole on the blanket. The arm 130 is held in position with the member 128 in engagement with the blanket by a torsion spring 164 mounted on the stud 132 connecting the arm 130 and the lever 134, one end of the spring acting against a pin 166 carried by the arm 130 and its other end against a pin 168 carried by the lever 134. An abutment plate 170, provided at the upper end of the arm 162 of the bracket 138, prevents the arm 130 from being moved too far upwardly in its retracting movement. Counterclockwise movement of the lever 134, under the action of the torsion spring 152, is limited by engagement of the lower end of the lever with a stop pin 172 mounted in the bracket 138.

The machine B shown in Fig. 1, in which soles prepared in the molding and activating machine A are attached to shoe bottoms, is a twin-station machine of the type disclosed in United States Letters Patent No. 2,716,766, granted September 6, 1955, upon an application filed in the name of Helge Gulbrandsen. The machine comprises a pair of pad boxes 174, each of which supports in upright position a sole and a lasted shoe C. The pad box at each station is moved vertically, by fluid pressure mechanism housed in a base 176 of the machine, relatively to abutments 178, 180 adapted, respectively, to engage the toe end of the shoe and the cone of a last L. The abutments 178, 180 are adjustably mounted in a jack 182 carried by a bracket 184 secured to a beam or crosshead 186 supported on the upper end of a post 188 extending from the base 176.

Vertical movement of the pad boxes 174 of the machine B, as well as that of the pad boxes 42 of the machine A, is controlled by electrical and fluid pressure mechanism provided in each machine. Except as hereinafter noted, the mechanism of the sole molding and activating machine A corresponds to that of the sole attaching machine B, and is substantially similar to that disclosed in the aforementioned Gulbrandsen patent, to which reference may be had for a more detailed description, only so much of the mechanism being described herein as is necessary to an understanding of the invention. In the description which follows, those elements of the electrical and fluid pressure mechanism which are duplicated in both machines will, for the sake of convenience, be identified by like reference characters, it being understood that certain elements of the mechanism are common to both stations of each machine.

The fluid pressure mechanism for elevating the work supporting pad box at each station of the sole attaching machine and the pad box at each station of the sole molding and activating machine comprises a pump 190 (Figs. 1 and 11) associated with each machine and connected to a reservoir 192. Each pump is driven constantly by an electric motor 194 to supply fluid under pressure through a pipe 196, manifold valves 198 (Fig. 11), one at each station of each machine, and control valves 200, first to a small cylinder 202 to operate a small piston 204 which applies primary pressure to raise the work supporting pad boxes of the machines A and B rapidly upon depression of the treadle 104 provided at each station of the machine B. After engagement of the work on the pad box with the cooperating pressure applying members, that is, either with the abutments 178, 180 of the sole attaching machine or with the upper mold 24 of the molding and activating machine, resistance to further movement of the work support causes the fluid pressure in the small cylinder 202 to build up until it attains a value determined by a pressure regulating valve 206. Thereupon, the pressure of the fluid acts upon a valve 208 contained in the cylinder 202 to move it downwardly into a position where a port in the valve is connected to a large cylinder 210 to permit fluid to flow into this cylinder and operate a large piston 212 which applies final, heavy pressure to the work, determined by a valve 214 which may be adjusted by means of a knob 215 provided on each machine. Pressure is maintained in the small cylinder 202 to hold the valve 208 in its depressed position until the end of a predetermined cycle.

Supply of pressure fluid to the small cylinder 202 at each station of both machines A and B is controlled by a valve 216 operated by a solenoid 218 (Figs. 11 and 12) which is energized by the closing of a switch 220, provided at each station of the sole attaching machine B, upon depression of the treadle 104 associated with each station of the sole attaching machine and connected to the switch arm by a rod 222 (Fig. 1). Energization of the solenoid 218 operates the valve 216 to permit fluid, which is normally supplied to the upper part of the cylinder control valve 200 from the supply pipe 196 and the solenoid valve 216, to exhaust, thereby permitting the control valve 200 to move upwardly into position where it permits fluid to flow into the small cylinder 202. When the solenoid 218 is deenergized at the end of a predetermined cycle, the control valve 200 is depressed, thereby permitting pressure fluid to be exhausted from both cylinders to the reservoir 192.

A cycle of operations of the two machines will now be described, with particular reference to the diagram of Fig. 11, which represents the fluid pressure mechanism for operating one station of each machine, and the diagram of Fig. 12, which represents the electrical controls for both stations of both machines. In the diagram of Fig. 12, the letters L and R designate the left and right-hand stations of each machine. Since the electrical controls and their functioning are identical in the two stations of each machine, only those of one station of each machine will be described. In the description which follows, it will be assumed that the two machines are at rest and the parts in the positions shown.

To start the machines, the operator first closes a normally open switch 224 (Fig. 12) by pressing a starter button 224' located on a switch box 226 mounted on the post 188 of the sole attaching machine B (Fig. 1). Closing of the switch 224 energizes a relay coil 228 (Fig. 12), closing normally open contacts 228a, 228b and 228c to energize the motor 194 which drives the pump of the fluid pressure system of the machine. Energization of the relay coil 228 also closes a normally open contact 228d to energize a line 236 through which power is supplied for the electrical components which control the fluid pressure system, this line including normally closed safety switches 238 connected in series and operated by push-pull buttons 238' located respectively on the switch box 226 of the machine B and on a switch box 240 mounted on the casting 14 of the machine A (Figs. 1 and 2). The switches 238, when opened by pushing in the button 238' of either machine, will deenergize the line 236 and depressurize the fluid pressure systems to allow the pad boxes at the stations of the two machines which have been operated to descend before the end of the normal predetermined cycle. The operator next closes a starter switch 242 (Fig. 12) in the circuit of the molding and activating machine by pressing a button 242' located on the switch box 240 (Figs. 1 and 2), energizing a relay coil 244 (Fig. 12) and closing contacts 244a, 244b, 244c, to energize the motor 194 which drives the pump of the fluid pressure system of that machine. Closing of the starter switch 242 also closes a normally open contact 244d to energize a line 252 which supplies electric current to the components which control the fluid pressure system. The operator will then turn the switches 32 (Figs. 1 and 2) to supply current to the heating units 26 mounted in the molds 24. The heating units for the cabinets 34 are supplied with current by turning on the master switches on the machine.

The two machines are now ready to be operated to mold a sole and activate the cement thereon and simultaneously to attach a previously molded sole to a lasted shoe. Taking a flat sole that has been precoated with a thermoplastic cement from a holder 254 mounted on the molding and activating machine A in front of each lower mold 40 (Fig. 2), the operator places the sole on the blanket 50 associated with the pad box of one station, utilizing the visual gaging means 52 (Fig. 4) provided on the blanket to locate the sole accurately with relation to the work engaging surface of the upper mold 24. Taking next a shoe from one of the heated cabinets 34 (Figs. 1 and 2) in which the cement on the bottom of the shoe has been activated, the operator spots a molded sole to the shoe and places the assembled shoe and sole on the pad of the pad box 174 at the corresponding station of the sole attaching machine B (Fig. 1).

When the operator depresses the treadle 104 at the selected station of the sole attaching machine, the switch 220 (Figs. 1 and 12) is closed, energizing a control relay coil 256 and closing normally open contacts 256a and 256b. Closure of contacts 256b completes a holding circuit through the relay coil 256, which circuit includes normally closed contacts 258a of a delay relay or timer of the type described in the Gulbrandsen patent previously referred to, thereby maintaining the control relay coil 256 energized after release of the treadle. Closing of the contacts 256a energizes the coil 258 of the timer and the solenoid 218 of the valve 216 (Figs. 1 and 11) which controls the flow of fluid to the small cylinder 202 to cause the small piston 204 of the fluid pressure system of the operated station of the sole attaching machine to elevate the pad box 174 at that station. The valve operating solenoid 218 (Fig. 12) remains energized until the contacts 256a and 256b are again opened at the end of a period determined by the setting of the timer in the manner described in the above-mentioned Gulbrandsen patent. Closing of the contacts 256a also energizes the coil 260 of a delay relay in the circuit of the molding and activating machine and, through normally closed contacts 260a, energizes the solenoid 102 (Figs. 2, 5 and 12), previously referred to, which operates the guard 78 (Figs. 2 and 5) to move it into the position in which it closes off the space between the upper and lower molds 24 and 40. After a period determined by adjustment of the delay relay, the contacts 260a are opened to deenergize the solenoid 102. The guard, however, remains in its lowered, operative position until the lower mold, in its downward movement away from the upper mold, actuates the link 88 (Fig. 5) to return the guard to its raised, inoperative position, in the manner hereinbefore explained. As the contacts 260a are opened, normally open contacts 260b (Fig. 12) are closed, energizing the coils 264, 266 of delay relays in the circuit of the molding and activating machine, to supply electric energy through normally closed contacts 264a, 266a to a selector switch 268, and energize the solenoid 218 of the valve 216 (Fig. 11) which controls the flow of pressure fluid to the small cylinder 202 to cause the small piston 204 to move the lower mold toward the upper mold.

Energization of the relay coils 264 and 266 (Fig. 12) starts the timing of the cycle of operations at the station of the molding and activating machine corresponding to the station of the sole attaching machine which has been operated. As a practical matter, it has been found that a suitable period for maintaining a sole and shoe under pressure to effect a good bond between them is approximately 15 seconds. Accordingly, the delay relay which includes the coil 258 in the circuit of each station of the sole attaching machine is set to open the contacts 258a and to deenergize the valve solenoid 218 at the end of that period. However, since, as previously explained, a molding and activating operation requires less time, the relay which includes the coil 260 and which controls the beginning of a cycle of operations of the molding and activating machine is set to energize the solenoid valve of a station of that machine approximately seven seconds after the beginning of the cycle of the corresponding station of the sole attaching machine. Under normal conditions, the cycle of the molding and activating machine would terminate near the end of the period for which the delay relay or timer of the sole attaching machine has been set, that is to say about six seconds after the energization of the solenoid valve of the molding and activating machine. But since, as also explained, rubber soles require a shorter molding period than do leather soles, provision is made for selectively determining the duration of the molding and activating cycle, according to whether the soles to be molded are leather or rubber.

As shown in Fig. 12, the relay coils 264, 266 are connected by leads 264b, 266b to the opposite terminals 268a, 268b of the selector switch 268, which is mounted on the molding and activating machine in a location where it is readily accessible to the operator. When the soles to be molded are leather, the operator will turn the switch to the right (Fig. 12) to connect the switch terminals to the relay coils 264, 266 through the contacts 266a which are set to open and deenergize the valve solenoid 218 approximately six seconds after the closing of the contacts 260b. If the soles to be molded are rubber, the operator will turn the switch 268 to the left (Fig. 12), which will connect the switch terminals to the relay coils 264, 266 through the contacts 264a which are set to open and deenergize the valve solenoid 218 approximately three seconds after the closing of the contacts 260b. The lower mold 40 of the molding and activating machine (Figs. 1 and 2) will, accordingly, be moved away from the cooperating upper mold 24 approximately two seconds, in the case of leather soles, and five seconds in the case of rubber soles, before the pad box 174 of the corresponding station of the sole attaching machine moves away from the abutments 178, 180. The time elapsing between the separation of the molds of the molding and activating machine and of the pad box and the abutments of the sole attaching machine allows the operator to remove the molded sole from the blanket 50, after it has been pushed forwardly of the blanket by the member 123 (Figs. 2 and 7), place another sole on the blanket, spot the molded sole to a shoe, and place the assembled sole and shoe on the pad box of the other station of the machine to repeat the cycle of operations in both machines.

Either machine may be completely stopped by opening a normally closed stop switch 270 or 272 (Fig. 12) provided in the circuit of each machine, by pressing the corresponding stop button 270' or 272' located on the switch boxes 226, 240 of the two machines (Figs. 1 and 2). The fluid pressure systems of both machines may be rendered inoperative at any time, without stopping the motors of the machines, by depressing the safety switch button 238' on either machine to open the switches 238 of both machines (Fig. 12) and cause the valve solenoids 218 to become deenergized and allow the pad boxes of the stations of the two machines which are then being operated to move away from the cooperating pressure applying members. To reenergize the electrical controls of the machines it is necessary to close the switches 238 by pulling out the buttons 238'.

Certain features of the invention described, but not claimed, herein are the subject matter of a divisional application, Serial No. 770,067, filed October 28, 1958.

Having thus described my invention, what I claim as new and desire to secure by Letters Patent of the United States is:

1. In combination, a pair of machines for operating upon work pieces, operator controlled means associated with one of said machines for initiating a cycle of operation thereof, means controlled by said machine for initiating operation of the other of said machines, means associated with each of said machines for automatically terminating operation thereof a predetermined time after the commencement of its operating cycle, and means on each machine by operation of either of which both machines may be stopped simultaneously at will before the end of their predetermined cycles.

2. In combination, a pair of machines for operating upon work pieces, operator controlled means associated with one of said machines for initiating a cycle of operation thereof, means for variably determining the duration of an operating cycle of said machine, means controlled by said machine for initiating an operating cycle of the other of said machines a predetermined time following initiation of the operating cycle of said one of said machines, and means in said other machine under the control of the operator for selectively determining the duration of the operating cycle of said other machine.

3. In combination, a pair of machines for operating upon work pieces, operator controlled means associated with the first of said machines for initiating an operating cycle thereof, means for automatically terminating said operating cycle of said machine a predetermined time following initiation thereof, means associated with the second of said machines and controlled by said first machine for initiating a cycle of operation of said second machine a predetermined time after initiation of the operating cycle of said first machine, and alternate means in said second machine for variably determining the duration of an operating cycle of said second machine.

4. In combination, a pair of machines for operating upon work pieces, operator controlled means associated with the first of said machines to initiate a cycle of operation thereof, a timer in said first machine for terminating its operating cycle a predtermined time after initiation thereof, means associated with the second of said machines and controlled by said first machine for initiating a cycle of operation of said second machine a predetermined time after the commencement of the operating cycle of said first machine, a pair of timers in said second machine arranged to terminate its operating cycle at different predetermined times following the commencement of the operating cycle of said second machine but prior to termination of the operating cycle of said first machine, and operator controlled means for selectively determining termination of the operating cycle of said second machine by either of said pair of timers.

5. In combination, a pair of machines for operating upon work pieces, operator controlled means for initiating a cycle of operation of the first of said machines, means controlled by said first machine for initiating a cycle of operation of the second of said machines a predetermined time following initiation of the operating cycle of said first machine, means associated with each of said machines for automatically terminating its operating cycle a predetermined time after the commencement thereof, and means operable, in response to initiation of the operation of said first machine, to prevent access to the work operating instrumentalities of said second machine until a predetermined time after initiation of the operation of said first machine.

6. In combination, a first machine for applying pressure to work pieces, operator controlled means for initiating the operation of said machine, means for variably determining the duration of an operating cycle of said machine, a second machine for applying pressure to work pieces, means associated with said second machine and controlled by operation of said first machine to initiate operation of said second machine a predetermined time following initiation of the operation of said first machine, alternate means associated with said second machine for variably determining the duration of an operating cycle of said second machine, and means on each machine by operation of either of which both machines may be stopped simultaneously at will prior to termination of their predetermined cycles.

7. In combination, a pair of machines each having cooperating, relatively movable members for applying pressure to a work piece supported on one of said members of each machine, operator controlled means associated with the first of said machines for initiating relative movement between the pressure applying members in one direction to operate upon the work piece therebetween, means controlled by operation of said operator controlled means for similarly initiating relative movement between the pressure applying members of the second of said machines in the same direction to operate upon the work piece therebetween a predetermined time after the beginning of the operating cycle of said first machine, a guard associated with said second machine and operative, in response to operation of said operator controlled means, immediately to close off the area between the pressure applying members of said second machine, and means for automatically causing relative movement between the pressure applying members of each machine in the opposite direction after the work pieces therebetween have been under pressure predetermined lengths of time.

8. In combination, a sole attaching machine comprising a sole attaching member movable into and out of pressure applying position, means for moving said member into pressure applying position, operator controlled means for initiating operation of said moving means, timing means operable automatically to terminate the pressure applying operation after the work has been under pressure for a predetermined length of time, a sole molding machine comprising a molding member movable into and out of pressure applying position, means for moving said sole molding member into pressure applying position, means operated by said sole attaching machine for initiating operation of the means for moving said sole molding member a predetermined time following movement of the sole attaching member into pressure applying position, and means for automatically terminating the sole molding operation after a variably predetermined length of time.

9. In combination, a machine for applying pressure to soles to mold them and simultaneously activate cement thereon to prepare them for attachment to shoes, said machine having a heated mold, a cooperating sole supporting mold movable into and out of pressure applying position relatively to said heated mold, fluid pressure means for moving said sole supporting mold, electrical controls for operating said fluid pressure means, and a machine for applying pressure to an assembled shoe and molded sole to effect their permanent attachment, said machine having a support for the assembled shoe and sole, cooperating pressure applying members, fluid pressure means for moving said support into pressure applying position relatively to said members, electrical controls for operating said fluid pressure means, operator controlled means for operating the last named electrical controls to initiate a cycle of operation of said sole attaching machine, means in the electrical controls of said sole attaching machine for rendering the electrical controls of said sole molding and activating machine effective to operate the fluid means of that machine and initiate movement of the sole supporting mold a predetermined time after operation of said operator controlled means, a timer in the electrical controls of said sole attaching machine for automatically rendering the fluid pressure means of said machine ineffective, thereby to terminate the operating cycle of the machine after the shoe and sole have been under pressure for a period of predetermined duration, a timer in the electrical controls of the molding and activating machine for determining initiation of a cycle of operation of the machine, an additional pair of timers adapted to terminate the operating cycle of the molding machine at different predetermined times after the initiation thereof, and an operator controlled selector switch for rendering either of said additional pair of timers operative to terminate the operating cycle in accordance with the type of sole to be molded.

10. In combination, a sole attaching machine having a support for a shoe and a sole to be attached thereto, means cooperating with said support to apply pressure to said shoe and sole to effect their attachment, means for moving said support into pressure applying position, operator controlled means for initiating operation of said moving means, a sole molding machine having a support for a sole and means cooperating with said support to apply pressure to the sole therebetween to impart to it a predetermined shape prior to its attachment to a shoe, means controlled by said sole attaching machine for initiating operation of the means for moving the support of the molding machine a predetermined time following movement of the support of the sole attaching machine into pressure applying position, timing means in each of said machines for automatically causing the work supports of the two machines to move out of pressure applying positions after predetermined periods, a guard operatively associated with the support of the molding machine and operated, in response to initiation of the operation of the moving means of the sole attaching machine, to move in one direction to close off the area between the support of the molding machine and the cooperating pressure applying member, said guard being moved in the opposite direction by movement of said support out of pressure applying position at the end of an operating cycle of the molding machine.

11. In combination, a pair of machines each having cooperating members movable toward and away from each other to apply pressure to a work piece therebetween, operator controlled means associated with one of said machines for initiating a cycle of operation thereof, means responsive to operation of said operator controlled means to initiate a cycle of operation of the other of said machines a predetermined time after initiation of the operating cycle of said one of said machines, a guard operatively connected to one of the pressure applying members of the other of said machines, power means in said other machine operated, in response to operation of said operator controlled means, to cause movement of said guard from an initial, retracted position to a position in which it closes off the area between the pressure applying members of the other of said machines and to maintain it in that position, said power means being operated, a predetermined time after its initial operation, to permit the guard to be moved to its initial position and locked therein by the movement of said one of the pressure applying members of the other of said machines away from its cooperating member.

12. In combination, a first machine for applying pressure to work pieces, power means for operating said machine, operator controlled means for rendering said power means effective to initiate a cycle of operation of said machine, a second machine having a stationary pressure applying member, a work support movable relatively to said stationary member to apply pressure to a work piece therebetween, power means rendered effective by operation of the operator controlled means of said first machine to initiate movement of said work support of said second machine a predetermined time following initiation of the cycle of operation of said first machine, a solenoid in the power means of said second machine energized by operation of said operator controlled means, a link connected to the solenoid and to the movable work support of the second of said machines, a guard pivotally connected to said link, means acting normally to hold said link in a position in which said guard is held in retracted, inoperative position and to release said link, upon energization of said solenoid, to permit said guard to move to its operative position to close off the area between the cooperating pressure applying members of the other of said machines and to be thereafter moved to its initially retracted position by the movement of the work support of said machine away from the cooperating pressure applying member.

13. In combination, a first machine for applying pressure to work pieces, power means for operating said machine, operator controlled means for rendering said power means effective to initiate a cycle of operation of said machine, a second machine having a stationary pressure applying member, a work support movable relatively to said stationary member to apply pressure to a work piece therebetween, power means rendered effective by operation of the operator controlled means of said first machine to initiate movement of said work support of said second machine a predetermined time following initiation of the cycle of operation of said second machine, a solenoid in the power means of said second machine energized by operation of said operator controlled means, a link connected to the solenoid and to the movable work support of the second of said machines, a guard pivotally connected to said link, means acting normally to lock said link in a position in which said guard is held in retracted, inoperative position and to release said link, upon energization of said solenoid, to permit said guard to move to its operative position to close off the area between the cooperating pressure applying members of said second machine and to be thereafter moved to its initially retracted position by the movement of the work support of said machine away from the cooperating pressure applying member, a spring for returning said link to its locking position after its release by said solenoid, and a lost motion in said link to prevent locking of said guard in its retracted position before the beginning of the movement of the work support away from the cooperating pressure applying member.

14. In combination, of first machine for operating upon work pieces, operator controlled fluid pressure means for initiating an operating cycle of said machine, means for variably determining the duration of an operating cycle of said machine, a second machine for operating upon work pieces, fluid pressure means in said second machine for operating the same, means controlled by said first machine for rendering the fluid pressure means in said second machine operative a predetermined time after initiation of an operating cycle of said first machine, and means in said second machine for variably determining the duration of an operating cycle of said second machine.

15. In combination, a pair of machines for operating upon work pieces, operator controlled means associated with one of said machines for initiating a cycle of operation thereof, means for variably determining the duration of an operating cycle of said machine, means controlled by said machine for initiating an operating cycle of the other of said machines a predetermined time following initiation of the operating cycle of said one of said machines, means in said other machine under the control of the operator for selectively determining the duration of the operating cycle of said other machine, and means on each machine by operation of either of which both machines may be stopped simultaneously at will prior to termination of their predetermined operating cycles.

16. In combination a sole attaching machine comprising a sole attaching member movable into and out of pressure applying position, means for moving said member into pressure applying position, operator controlled means for initiating operation of said moving means, timing means operable automatically to terminate the pressure applying operation after the work has been under pressure for a predetermined length of time, a sole molding machine comprising a molding member movable into and out of pressure applying position, means for moving said sole molding member into pressure applying position, means operated by said sole attaching machine for initiating operation of the means for moving said sole molding member a predetermined time following movement of the sole attaching member into pressure applying position, means for automatically terminating the sole molding operation after a variably predetermined length of time, and means on each machine by operation of either of which both machines may be stopped simultaneously at will prior to termination of their predetermined operating cycles.

17. In combination, a sole attaching machine comprising a sole attaching member movable into and out of pressure applying position, means for moving said member into pressure applying position, operator controlled means for initiating operation of said moving means, timing means operable automatically to terminate the pressure applying operation after the work has been under pressure for a predetermined length of time, a sole molding machine comprising a molding member movable into and out of pressure applying position, means for moving said sole molding member into pressure applying position, means operated by said sole attaching machine for initiating operation of the means for moving said sole molding member a predetermined time following movement of the sole attaching member into pressure applying position, and alternate means in said sole molding machine for variably determining the duration of an operating cycle of said sole molding machine.

18. In combination, a sole attaching machine comprising a sole attaching member movable into and out of pressure applying position, means for moving said member into pressure applying position, operator controlled means for initiating operation of said moving means, timing means operable automatically to terminate the pressure applying operation after the work has been under pressure for a predetermined length of time, a sole molding machine comprising a molding member movable into and out of pressure applying position, means for moving said sole molding member into pressure applying position, means operated by said sole attaching machine for initiating operation of the means for moving said sole molding member a predetermined time following movement of the sole attaching member into pressure applying position, and means in said sole molding machine for selectively determining the duration of an operating cycle of said sole molding machine.

19. In combination, a sole attaching machine comprising a sole attaching member movable into and out of pressure applying position, means for moving said member into pressure applying position, operator controlled means for initiating operation of said moving means, timing means operable automatically to terminate the pressure applying operation after the work has been under pressure for a predetermined length of time, a sole molding machine comprising a molding member movable into and out of pressure applying position, means for moving said sole molding member into pressure applying position, means operated by said sole attaching machine for initiating operation of the means for moving said sole molding member a predetermined time following movement of the sole attaching member into pressure applying position, means in said sole molding machine for selectively determining the duration of an operating cycle of said sole molding machine, and means on each of said sole attaching and sole molding machines by operation of either of which the pressure applying operation of the sole attaching member and of the sole molding member may be terminated simultaneously at any time at the will of the operator.

References Cited in the file of this patent

UNITED STATES PATENTS

| | | |
|---|---|---|
| 1,176,916 | Lund | Mar. 28, 1916 |
| 2,114,729 | Twomley | Apr. 19, 1938 |
| 2,287,242 | Hart | June 23, 1942 |